United States Patent
Tsurumoto

(10) Patent No.: US 7,869,594 B2
(45) Date of Patent: Jan. 11, 2011

(54) DIGITAL BROADCASTING RECEIVING SYSTEM AND DIGITAL BROADCASTING RECEIVING DEVICE

(75) Inventor: Takashi Tsurumoto, Saitama (JP)

(73) Assignee: Sony Corporation, Tokyo (JP)

( * ) Notice: Subject to any disclaimer, the term of this patent is extended or adjusted under 35 U.S.C. 154(b) by 1087 days.

(21) Appl. No.: 11/555,067

(22) Filed: Oct. 31, 2006

(65) Prior Publication Data

US 2007/0116276 A1 May 24, 2007

(30) Foreign Application Priority Data

Nov. 9, 2005 (JP) .............................. 2005-325361

(51) Int. Cl.
*H04N 7/167* (2006.01)

(52) U.S. Cl. ........................ 380/200; 380/201; 713/189

(58) Field of Classification Search ....................... None
See application file for complete search history.

(56) References Cited

U.S. PATENT DOCUMENTS

| | | | | |
|---|---|---|---|---|
| 6,028,937 | A * | 2/2000 | Tatebayashi et al. | ........ 713/169 |
| 6,141,681 | A * | 10/2000 | Kyle | ........................ 709/206 |
| 6,266,416 | B1 * | 7/2001 | Sigbjornsen et al. | ........ 380/255 |
| 6,286,103 | B1 * | 9/2001 | Maillard et al. | ............... 726/26 |
| 7,051,211 | B1 * | 5/2006 | Matyas et al. | ............... 713/187 |
| 7,089,425 | B2 * | 8/2006 | Chan | ........................... 713/189 |

| | | | |
|---|---|---|---|
| 2005/0078822 A1 * | 4/2005 | Shavit et al. | ................. 380/201 |

FOREIGN PATENT DOCUMENTS

| | | |
|---|---|---|
| JP | 2005-018725 A1 | 1/2005 |
| JP | 2005-057459 | 3/2005 |
| JP | 2005-100378 | 4/2005 |
| JP | 2005-222418 | 8/2005 |
| WO | 2005/020043 | 3/2005 |
| WO | 2005/098570 A1 | 10/2005 |

* cited by examiner

*Primary Examiner*—Kambiz Zand
*Assistant Examiner*—Peter Poltorak
(74) *Attorney, Agent, or Firm*—K&L Gates LLP

(57) ABSTRACT

A digital broadcasting receiving system is provided. The digital broadcasting receiving system includes an information processing device for executing a loader, a main process, and a supervisory process, a digital broadcasting receiving device detachably connected to the information processing device. The information processing device includes storage section on which the loader is developed, and transmits the main process and the supervisory process to the digital broadcasting receiving device. The digital broadcasting receiving device includes receiving section for receiving the broadcast signal to generate content data, decryption key storage section, process decryption section for decrypting the main process and the supervisory process using the decryption key, protective data adding section for adding protective data to the main process decrypted by the process decryption section, and first protective data storage section. The information processing device, in accordance with the loader, receives the decrypted main process and the decrypted supervisory process from the digital broadcasting receiving device.

10 Claims, 7 Drawing Sheets

DIGITAL BROADCASTING RECEIVING SYSTEM AND DIGITAL BROADCASTING RECEIVING DEVICE

CROSS REFERENCES TO RELATED APPLICATIONS

The present application claims priority to Japanese Patent Application JP 2005-325361 filed in the Japan Patent Office on Nov. 9, 2005, the entire contents of which being incorporated herein by reference.

BACKGROUND

The present disclosure relates to a digital broadcasting receiving system and a digital broadcasting receiving device capable of protecting digital broadcasting contents.

Domestic terrestrial digital broadcasting receiving devices are obligated to be compliant with the provisions stipulated in chapter 8 of ARIB TR-B 14 and ARIB TR-B15. Thus, protection of the broadcast contents is intended.

However, in the case in which dedicated application software is installed in a commercial personal computer (PC) to receive the terrestrial digital broadcast, since the dedicated application software can easily be altered, there are many cases in which it becomes difficult to be compliant with the provision of making it difficult to break down the content protection function including copy control.

This is caused by, for example, a tool and an analysis device for analyzing software that can easily be obtained to analyze the codes of the software and put back the analyzed software to the previous state.

As a method of preventing alteration of the received content, there has been from the past a method of encrypting the content when the digital broadcast content is delivered between two devices as described in JP-A-2005-057459.

However, even if such a system for protecting the contents is used, the program file for executing the system is still at risk for alteration.

SUMMARY

In view of the existing current conditions, it is desirable to provide a digital broadcasting receiving system which is a system for receiving content data of the digital broadcasting, and capable of protecting the content by executing a program whose alteration is prevented, and a digital broadcasting receiving device.

According to an embodiment, there is provided a digital broadcasting receiving system including an information processing device for executing a program file including a loader, a main process that is at least partially encrypted, and a supervisory process that is at least partially encrypted and for supervising main processing according to the main process, and a digital broadcasting receiving device detachably connected to the information processing device and for receiving a broadcast signal of digital broadcasting, wherein the information processing device includes storage means on which the loader is developed in a executable condition, and transmits the main process that is at least partially encrypted and the supervisory process that is at least partially encrypted to the digital broadcasting receiving device, the digital broadcasting receiving device includes receiving means for receiving the broadcast signal of the digital broadcasting to generate content data, decryption key storage means for storing a decryption key, process decryption means for decrypting the main process that is at least partially encrypted and the supervisory process that is at least partially encrypted received from the information processing device using the decryption key stored in the decryption key storage means, protective data adding means for adding protective data to the main process decrypted by the process decryption means, and first protective data storage means for storing the protective data, the information processing device, in accordance with the loader, receives the decrypted main process and the decrypted supervisory process from the digital broadcasting receiving device, and develops the decrypted main process and the decrypted supervisory process on the storage means included in the information processing device.

According to another embodiment, there is provided a digital broadcasting receiving device detachably connected to an information processing device for executing a program file including a loader, a main process that is at least partially encrypted, and a supervisory process that is at least partially encrypted and for supervising main processing according to the main process for receiving a broadcast signal of digital broadcasting, and to which the main process that is at least partially encrypted and the supervisory process that is at least partially encrypted are transmitted in accordance with the loader from the information processing device provided with a storage means on which the loader is developed in a executable condition, including receiving means for receiving the broadcast signal of the digital broadcasting to generate content data, decryption key storage means for storing a decryption key, process decryption means for decrypting the main process that is at least partially encrypted and the supervisory process that is at least partially encrypted transmitted from the information processing device using the decryption key stored in the decryption key storage means, protective data adding means for adding protective data to the main process decrypted by the process decryption means, and first protective data storage means for storing the protective data.

According to the embodiments, when the program file used for the digital broadcasting receiving system is developed on the storage means, the previously encrypted main process and the previously encrypted supervisory process can be decrypted, and further, the program file can be protected by adding the protective data to the main process.

Additional features and advantages are described herein, and will be apparent from, the following Detailed Description and the figures.

DETAILED DESCRIPTION

Hereinafter, embodiments are described in detail with reference to the accompanying drawings.

Figure 1:
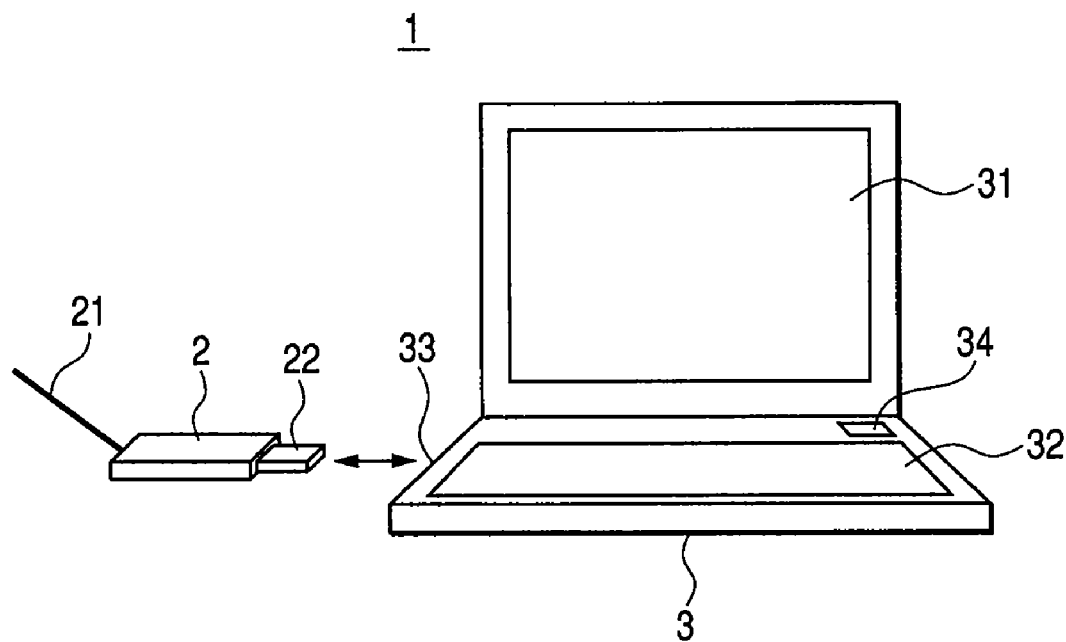
FIG. 1 is a diagram showing an exterior configuration of a digital broadcasting receiving system according to an embodiment.

FIG. 1 is a diagram showing an exterior configuration of a digital broadcasting receiving system 1 according to an embodiment.

The digital broadcasting receiving system 1 is configured with a digital broadcasting receiving device 2 and a PC 3 as an information processing device detachably connected to each other.

The digital broadcasting receiving device 2 has an exterior configuration of connecting an antenna 21 and an interface (I/F) 22 such as a universal serial bus (USB) terminal to a main body.

Further, the PC 3 has an exterior configuration as a typical PC including a display screen 31, an input key 32, an interface (I/F) 33 such as a USB inlet, a loudspeaker 34, and so on.

If the digital broadcasting receiving device 2 is connected thereto via the interface (I/F) 22 and the interface (I/F) 33, the digital broadcasting receiving device 2 receives a broadcast signal of one-segment broadcasting of the terrestrial digital broadcasting via the antenna 21, and the PC 3 performs a predetermined signal process to display a moving image of the one-segment broadcasting on the display screen 31, and to output a sound from the loudspeaker 34.

It should be noted that the one-segment broadcasting denotes simplified moving picture broadcasting utilizing the strongest one layer of segments defined by dividing a 6 MHz band forming one cannel of the terrestrial digital broadcasting into thirteen segments, and is applied to mobile terminal devices such as a PC. It should also be noted that a receiving section 201 is assumed to be able to receive not only the broadcast signal of the one-segment broadcasting but also the broadcast signal of full segment broadcasting in the terrestrial digital broadcasting.

Figure 2:
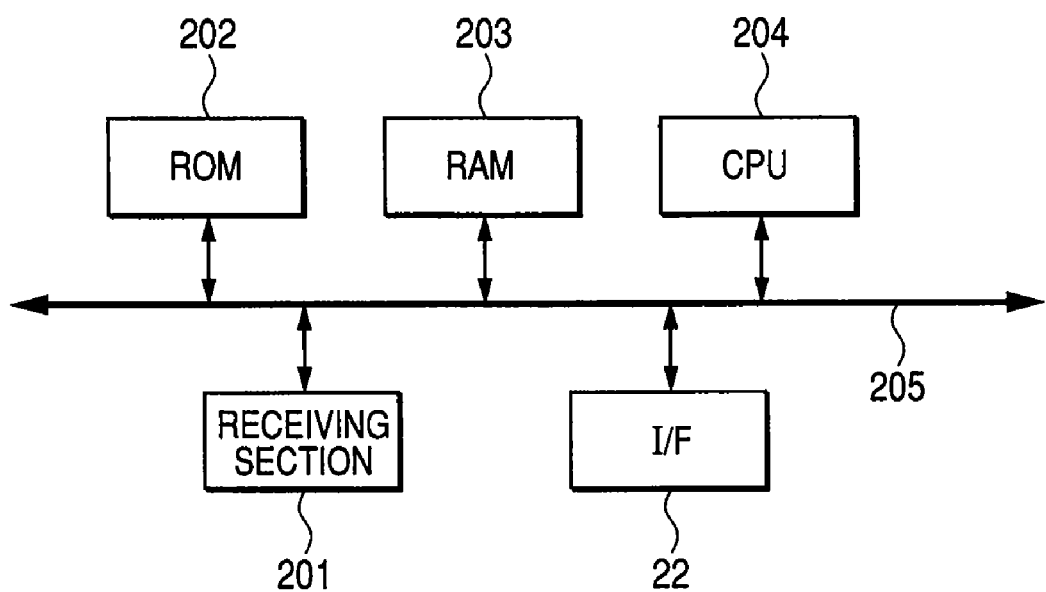
FIG. 2 is a diagram showing an interior configuration of the digital broadcasting receiving device according to an embodiment.

FIG. 2 is a functional block diagram showing an interior configuration of the digital broadcasting receiving device 2 used for the digital broadcasting system 1 according to an embodiment.

The digital broadcasting receiving device 2 is configured with the interface (I/F) 22, the receiving section 201 for receiving a broadcast signal of the one-segment broadcasting via the antenna 21, a read only memory (ROM) 202, a random access memory (RAM) 203, and a CPU 204 all connected to an internal bus 205.

Figure 3:
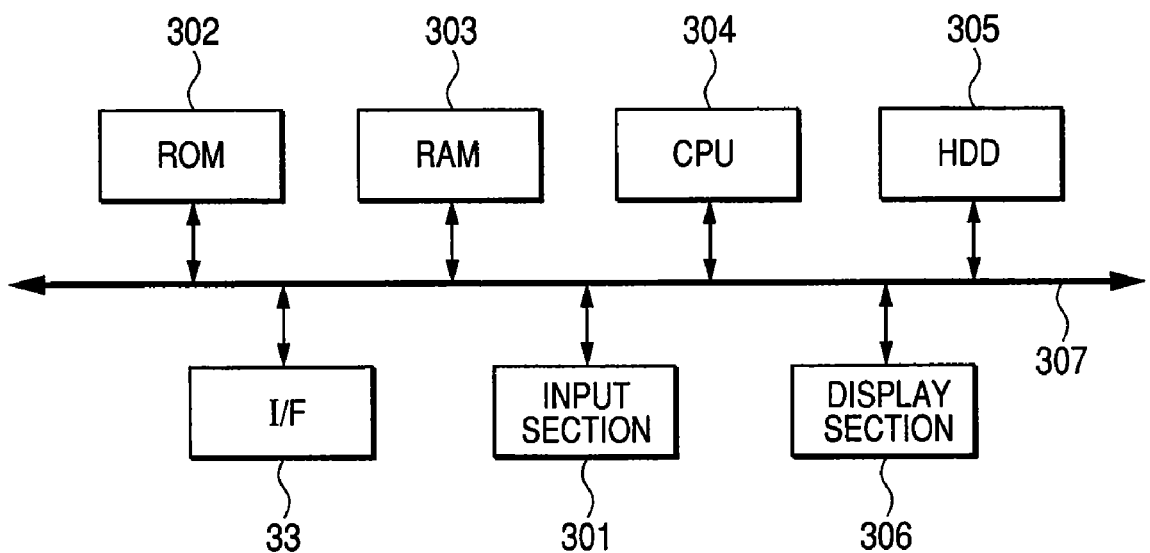
FIG. 3 is a diagram showing an interior configuration of a PC according to an embodiment.

FIG. 3 is a functional block diagram showing an interior configuration of the PC 3 used for the digital broadcasting system 1 according to an embodiment.

The PC 3 is configured with the interface (I/F) 33, an input section 301 for inputting data control by the user from the input key 32, a ROM 302, a RAM 303, a CPU 304, a hard disk drive (HDD) 305, and a display 306 for displaying a moving picture on the display screen 31 and outputting a sound from the loudspeaker 34 all connected to an internal bus 307.

Figure 4:
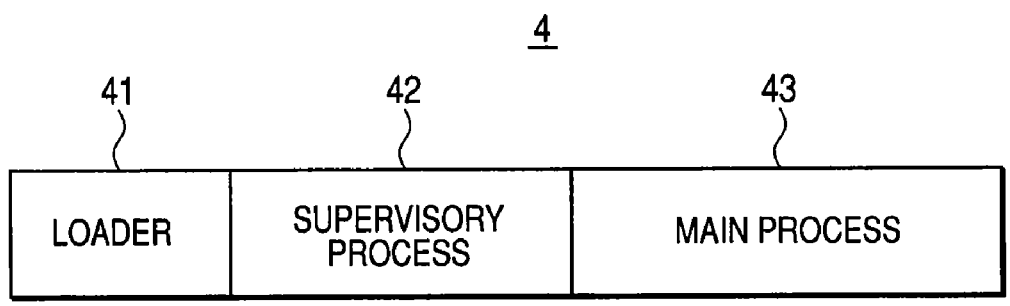
FIG. 4 is a configuration diagram of a program file according to an embodiment.

A program file 4 of dedicated application software used for the digital broadcasting receiving system 1 according to an embodiment is configured with three programs, namely a loader 41, a supervisory process 42, and a main process 43 as shown in FIG. 4, wherein the supervisory process 42 and the main process 43 are previously encrypted. The program file 4 is supplied by downloading via a network such as the Internet or with a recording medium such as a compact disc read only memory) CD-ROM. The program file 4 is temporarily stored in a storage device provided in the PC 3.

Figure 5:
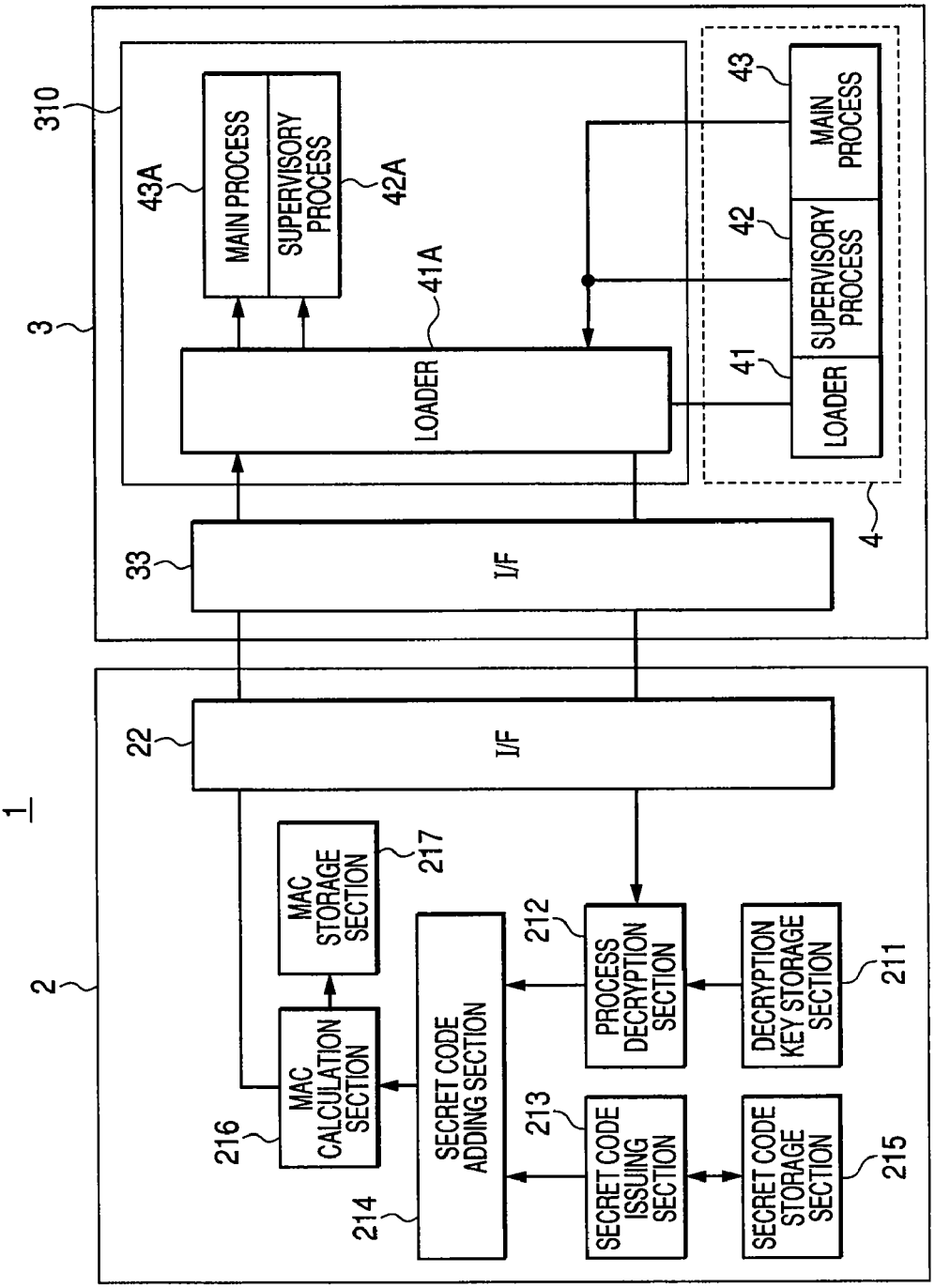
FIG. 5 is a diagram showing a process step in which a digital broadcasting receiving system according to an embodiment develops the program file on storage means.

FIG. 5 is a diagram showing how the digital broadcasting receiving system 1 according to an embodiment develops the program file 4 on the storage section 310 provided in the PC 3.

It should be noted that each of the functional blocks performing a series of data processes in the digital broadcasting receiving system 1 is provided inside the CPU. Further, each of the functional blocks for temporarily storing the series of data is a partial area of the RAM. Still further, the program to be performed by the CPU is written in the ROM.

The loader 41 out of the program file 4 is developed on the storage section 310, and the supervisory process 42 and the main process 43 are transmitted to a process decryption section 212 in the digital broadcasting receiving device 2 via the interface (I/F) 33 and the interface (I/F) 22 in accordance with the loader 41 thus enabled.

A decryption key storage section 211 stores decryption keys for decrypting the encrypted supervisory process 42 and the encrypted main process 43.

The process decryption section 212 decrypts the encrypted supervisory process 42 and the encrypted main process 43 using the decryption keys stored in the decryption key storage section 211.

A secret code issuing section 213 issues secret codes and supplies a secret code adding section 214 and a secret code storage section 215 with the secret codes every time the digital broadcasting receiving device 2 receives the supervisory process 42 and the main process 43.

The secret code adding section 214 adds the secret codes supplied from the secret code issuing section 213 to the decrypted supervisory process 42 and the decrypted main process 43, and then supplies an MAC calculation section 216 with the supervisory process 42 and the main process 43.

The secret code storage section 215 stores the secret codes supplied from the secret code issuing section 213.

The secret code adding section 214 adds the secret codes supplied from the secret code issuing section 213 to the decrypted supervisory process 42 and the decrypted main process 43, to supply the message authentication code (MAC) calculation section 216 with the supervisory process 42 added with the secret code and the main process 43 added with the secret code.

The MAC calculation section 216 calculates the MAC of the main process 43, and then supplies an MAC storage section 217 with the MAC. It should be noted here that the MAC can be a keyed-hashing for message authentication code (HMAC) using a hash function. If the MAC calculation section 216 uses the HMAC, the MAC calculation section 216 calculates a characteristic number based on the original program of the main process 43 by the hash function, and regards the characteristic number as the MAC.

Further, the MAC calculation section 216 transmits the supervisory process 42 and the main process 43 to the PC 3 via the interface (I/F) 22 and the interface (I/F) 33.

The MAC storage section 217 stores the MAC supplied from the MAC calculation section 216.

Further, although in the digital broadcasting receiving system 1 the secret code and the MAC are used as protection data for protecting the main process, the protection data is not limited thereto.

In accordance with the loader 41A, the PC 3 temporarily stores the supervisory process 42 and the main process 43 in the storage section 310 and then develops them thereon in response to receiving the supervisory process 42 and the main process 43 from the MAC calculating section 634 via the interface (I/F) 22 and the interface (I/F) 33. It should be noted here that the supervisory process and the main process developed on the storage section 310 and enabled to be executed are referred to as the supervisory process 42A and the main process 43A, respectively.

When execution of the supervisory process 42A and the main process 43A is stopped, the storage section 310 is released, and accordingly, the supervisory process 42A and the main process 43A are erased from the storage section 310.

When the supervisory process 42 and the main process 43 pass through the interface (I/F) 22 and the interface (I/F) 33, there the binary codes of the program file 4 might be taken out between these interfaces.

Figure 6:
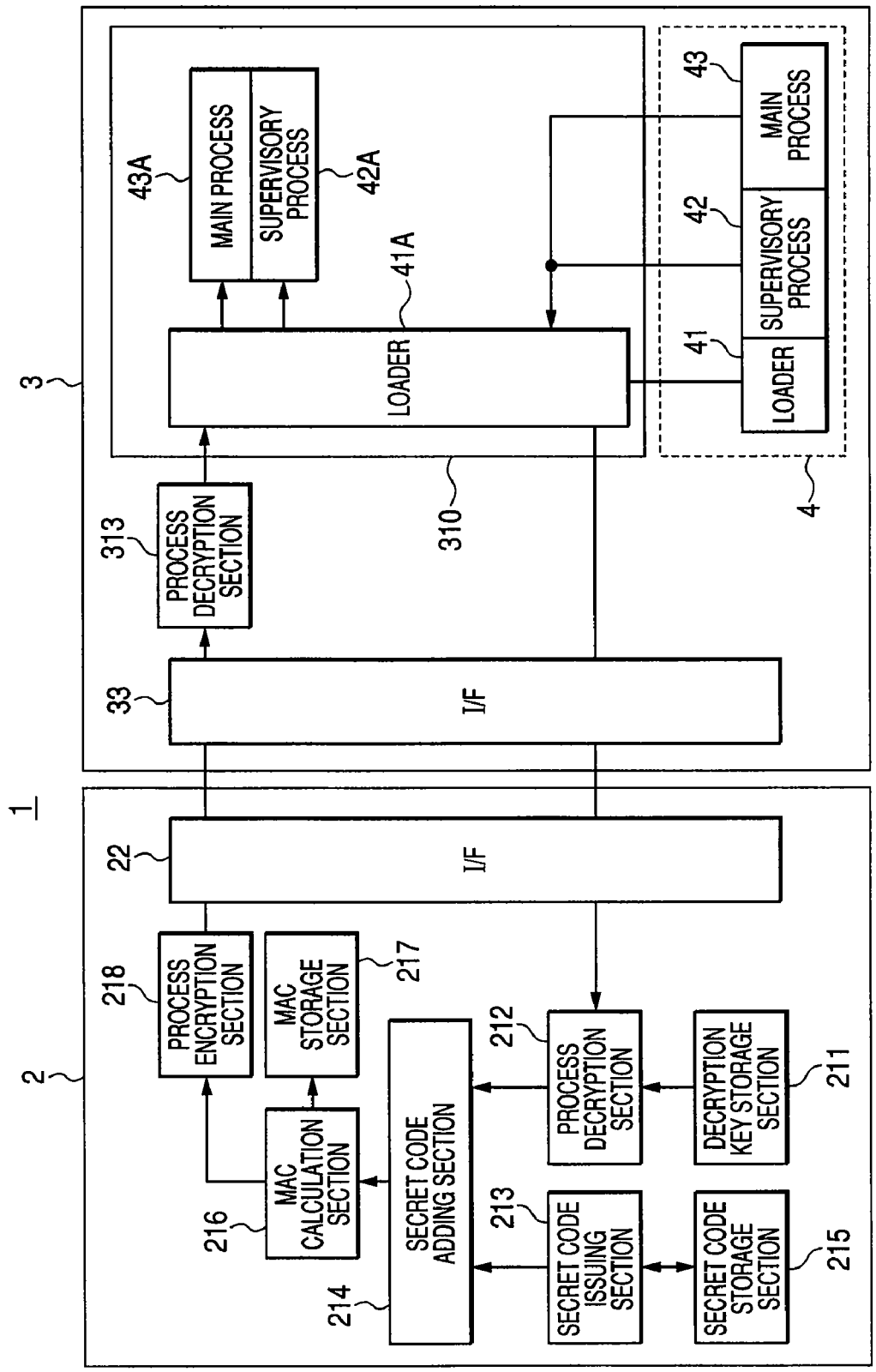
FIG. 6 is a diagram showing a process step in which a digital broadcasting receiving system according to an embodiment develops the program file on storage means.

Therefore, in order to enhance the protection function of the program file 4, it is possible to provide a process encryption section 218 in the digital broadcasting receiving device and a process decryption section 313 in the PC 3, respectively, in addition to the configuration shown in FIG. 5 as shown in FIG. 6. It should be noted that the same components as in FIG. 5 will be denoted with the same reference numerals, and the detailed descriptions therefor will be omitted.

The secret code adding section 214 adds the secret codes to the decrypted supervisory process 42 and the decrypted main process 43, and subsequently the process encryption section 218 encrypts the supervisory process 42 and the main process 43 both decrypted by the process decryption section 212 after the MAC calculation section 216 calculates the MAC of the main process 43. After then, the process encryption section 218 transmits the encrypted supervisory process 42 and the encrypted main process 43 to the process decryption section 313 via the interface (I/F) 22 and the interface (I/F) 33.

The process decryption section 313 decrypts the supervisory process 42 and the main process 43 received from the process encryption section 218, and then temporarily stores the supervisory process 42 and the main process thus decrypted in the storage section 310 and develops them on the storage section 310.

It should be noted here that the encryption key used by the process encryption section 218 and the decryption key used by the process decryption section 313 are set to have the same values, and further, the encryption key and the decryption key are set to have different values from the value of the decryption key stored in the decryption key storage section 211.

Figure 7:
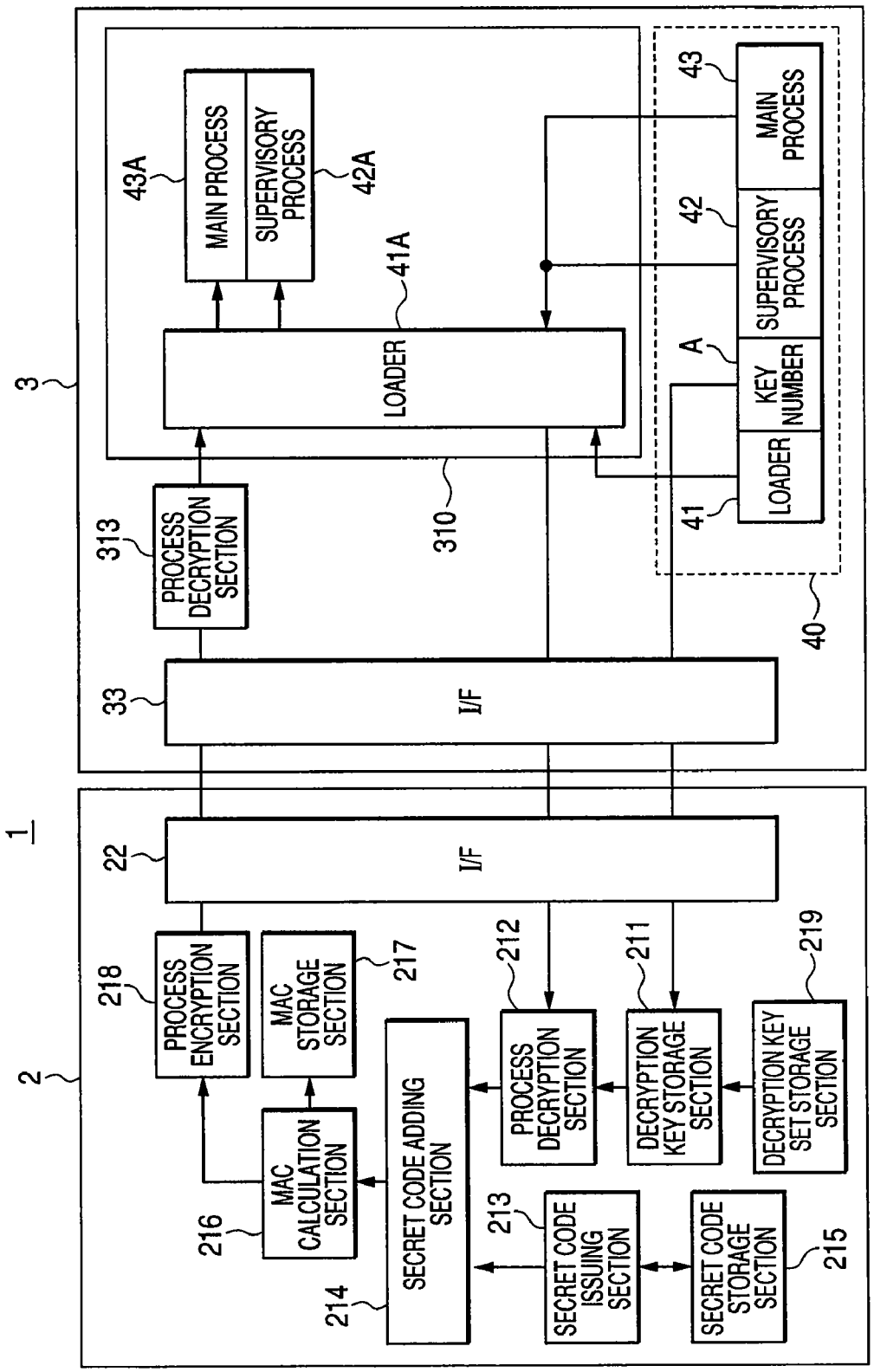
FIG. 7 is a diagram showing a process step in which a digital broadcasting receiving system according to an embodiment develops the program file on storage means.

Although in the configurations shown in FIGS. 5 and 6, as the encryption keys for encrypting the supervisory process 42 and the main process 43 in the program file 4, the same values are used for all of the program files, it is possible to alter the values of the encryption keys for every version or variation of the program file, for example. Therefore, as shown in FIG. 7, it is also possible to use a program file 40 obtained by adding a key number A to the program file 4 and to further provide a decryption key set storage section 219 to the decryption key storage section 211. It should be noted that the same components as in FIG. 6 will be denoted with the same reference numerals, and the detailed descriptions therefor will be omitted.

The program file 40 has the key number A of the encryption key used for encrypting the supervisory process 42 and the main process 43 attached thereto.

The decryption key set storage section 219 stores a number of decryption key sets each composed of the key number attached to every program file and the decryption key corresponding to the key number.

In response to receiving the supervisory process 42 and the main process 43, the decryption key storage section 211 selects the key number with the same value as the key number A from the decryption key set storage section 219, takes out the decryption key corresponding to this key number, and stores it.

Since in the configuration shown in FIG. 7, the unique key number is attached to every program file, and the encrypted supervisory process 42 and the encrypted main process 43 are decrypted using the decryption key corresponding to the key number, the protection function of the program file can further be enhanced.

It should be noted that although the whole of the supervisory process 42 and the whole of the main process 43 are encrypted and decrypted here, it is also possible to encrypt and decrypt only a part of each of the processes having particular needs for preventing alteration.

Figure 8:
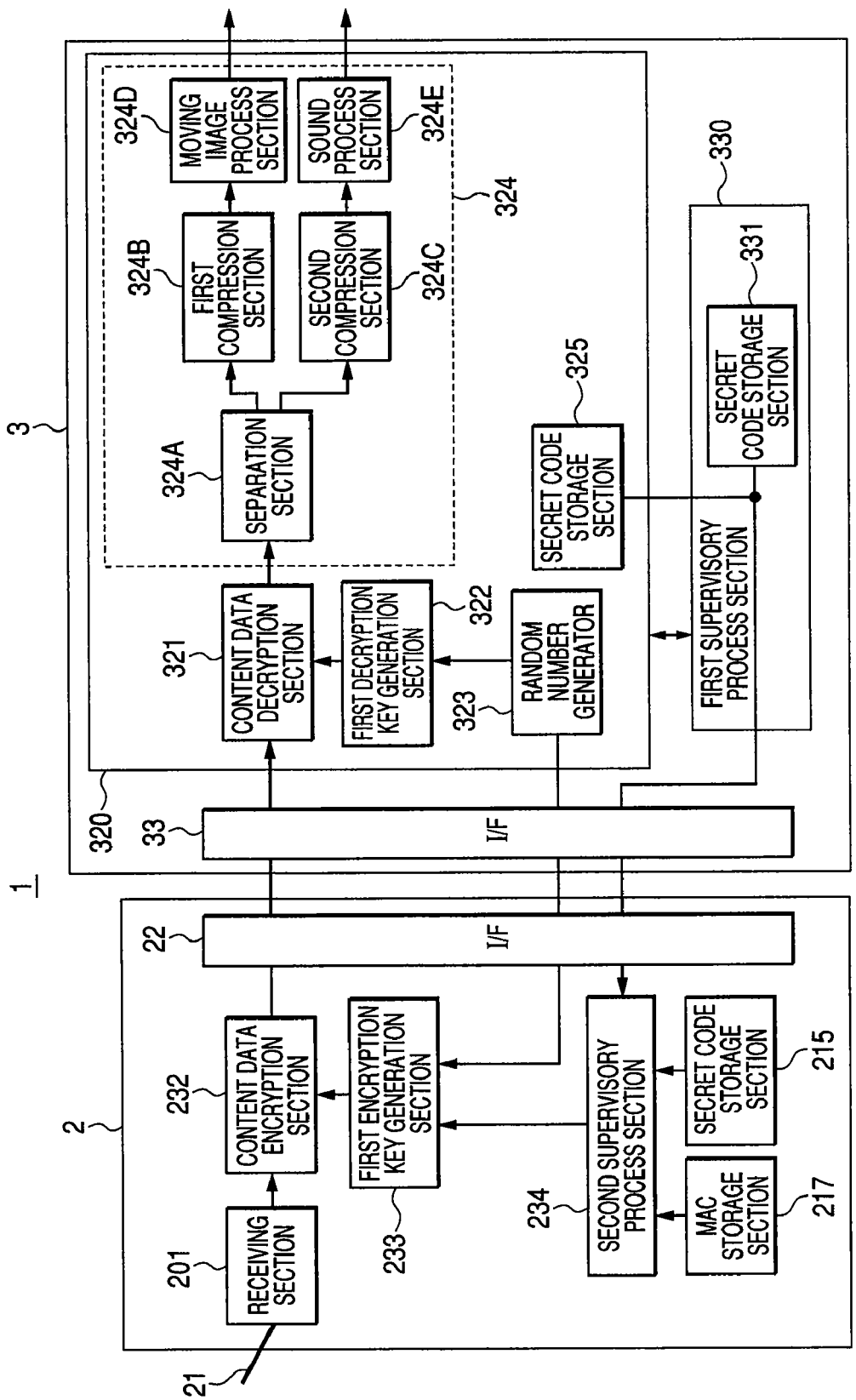
FIG. 8 is a diagram showing a data processing operation of content data executed by the digital broadcasting receiving system according to an embodiment.

In the digital broadcasting receiving system 1 according to an embodiment, as described above, the digital broadcasting receiving device 2 and the PC 3 receives the one-segment broadcasting signal and performs a predetermined data process as shown in FIG. 8 in accordance with the supervisory process 42A and the main process 43A, which have thus developed on the storage section 310 and become executable.

FIG. 8 is a diagram for explaining a first embodiment of the digital broadcasting receiving system 1 receiving the one-segment broadcasting signal and performing the predetermined data process.

In the PC 3, the main process section 320 according to the main process 43A is provided with a content data decryption section 321, a first decryption key generation section 322, a random number generator 323, a content reproduction section 324, and a secret code storage section 325.

Further, a first supervisory process section 330 for supervising the main process section 320 in accordance with the supervisory process 42A is provided with a secret code storage section 331.

In accordance with channel selection control input to the input section 301 in the PC 3, the receiving section 201 in the digital broadcasting receiving device receives the broadcasting signal of the one-segment broadcasting via the antenna 21, selects the frequency of a specific broadcasting station of the one-segment broadcasting, and then decrypts the radio wave of the broadcasting station to generate the video and audio content data, and supplies a content data encryption section 232 with the data.

The random number generator 323 periodically generates a random number as the predetermined data described above to supply it to the first decryption key generation section 322, and also supplies the first encryption key generation section 233 in the digital broadcasting receiving device 2 with the generated random number via the interface (I/F) 33 and the interface (I/F) 22.

The first encryption key generation section 233 generates the encryption key using the random number supplied from the random number generator 323.

The first decryption key generation section 322 generates the decryption key using the random number supplied from the random number generator 323.

The content data encryption section 232 encrypts the content data applying a common key encryption method such as the data encryption standard (DES) or the wired equivalent privacy (WEP).

The content data encryption section 232 encrypts the content data using the encryption key generated by the first encryption key generation section 233, and transmits it to the content data decryption section 321 provided to the main process section 320 via the interface (I/F) 22 and the interface (I/F) 33.

The first encryption key generation section 233 and the first decryption key generation section 322 respectively generate the encryption key and the decryption key by applying a common key generation algorithm on the common random number in accordance with the common key encryption method described above. It should be noted that the key length of the generated encryption and decryption keys is assumed to be equal to or greater than 56 bits.

Thus, the values of the encryption key and the decryption key respectively generated by the first encryption key generation section 233 and the first decryption key generation section 322 become the same. Further, since the key generation algorithm is kept confidential, even if the value of the random number is somehow decrypted, there is no chance that the value of the encryption key and the value of the decryption key can be decrypted.

The content data decryption section 321 decrypts the content data, which is encrypted by the content data encryption section 232, using the decryption key generated by the first decryption key generation section 322.

The content reproduction section 324 is provided with a separation section 324A, a first compression section 324B, a second compression section 324C, a moving image process section 324D, and a sound process section 324E.

As the separation section 324A, two-bit demultiplexing is used here. The two-bit demultiplexing divides the encrypted and then decrypted content data into content data for moving image and content data for sound.

The first compression section 324B performs compression of the content data for moving image using H.264 to generate moving picture compression data.

The second compression section 324C performs compression of the content data for sound using advanced audio coding (AAC) to generate audio compression data.

The moving image process section 324D performs a moving image process using the moving picture compression data to supply the display section 306 with a moving picture signal.

The sound process section 324E performs a sound process using the audio compression data to supply the display section 306 with an audio signal.

The secret code storage section 325 stores the secret codes attached to the main process 43.

The first supervisory process section 330 periodically takes out the secret codes respectively stored in the secret code storage section 325 and the secret code storage section 331 as the protective data of the main process section 320, and transmits to the second supervisory process section 234 in the digital broadcasting receiving device 2 via the interface (I/F) 33 and the interface (I/F) 22.

Further, the first supervisory process section 330 periodically calculates the MAC of the main process section, and transmits the MAC to the second supervisory process section 234 as the protective data of the main process section 320 in accordance with the main process 43A via the interface (I/F) 33 and the interface (I/F) 22.

In the case in which, for example, the second supervisory process section 234 does not receive these protective data periodically from the first supervisory process section 330 or it receives other data than the protective data, the supervisory process section 234 judges that some sort of problem has occurred in the system, and generates supervisory result data indicative of malfunction of the system to supply the first encryption key generation section 233 with the supervisory result data. The first encryption key generation section 233 changes the value of the encryption key in accordance with the supervisory result data. In this case, the display section 306 in the PC 3 is disabled from outputting a moving image or a sound.

Further, the second supervisory process section 234 compares the value of the secret code received from the first supervisory process section 330 with the value of the secret code stored in the secret code storage section 215. Subsequently, the second supervisory process section 234 supplies the first encryption key generation section 233 with the supervisory result data based on the result of the comparison.

The first encryption key generation section 233 supplied with the supervisory result data changes the value of the encryption key if the values of the secret codes are different from each other.

Further, the second supervisory process section 234 compares the MAC received from the first supervisory process section 330 with the MAC stored in the MAC storage section 217. Subsequently, the second supervisory process section 234 generates the supervisory result data based on the result of the comparison to supply it to the first encryption key generation section 233.

The first encryption key generation section 233 supplied with the supervisory result data changes the value of the encryption key if the values of the MACs are different from each other.

In the digital broadcasting receiving system 1 provided with the configuration described above, when the receiving section 201 supplies the content data encryption section 232 with the content data of the one-segment broadcasting, the content data encryption section 232 encrypts the content data using the encryption key generated by the first encryption key generation section 233, and supplies the content data decryption section 321 with the encrypted content data via the interface (I/F) 22 and the interface (I/F) 33. The content data decryption section 321 then decrypts the content data encrypted by the content data encryption section 232 using the decryption key generated by the first decryption key generation section 322, and supplies the separation section 324A with the decrypted content data. The encryption key and the decryption key are generated by applying the common key generation algorithm on the random number generated by the random number generator 323, and accordingly become the same values.

Further, in the digital broadcasting receiving system 1 provided with the configuration described above, the first supervisory process section 330 according to the supervisory process 42A periodically transmits the secret code and the MAC to the second supervisory process section 234 as the protective data. The second supervisory process section 234 compares the secret code stored in the secret code storage section 215 and the MAC stored in the MAC storage section 217 with the secret code and the MAC received from the first supervisory process section 330, respectively, to generate the supervisory result data. If there is a discrepancy between the protective data compared based on the supervisory result data, the first encryption key generation section 233 changes the encryption key.

Further, if any problems have occurred in the system, the second supervisory process section 234 generates the supervisory result data accordingly. Further, the first encryption key generation section 233 changes the encryption key in accordance with the supervisory result data.

As described above, the digital broadcasting receiving system 1 can be stopped by changing the encryption key if some sort of problem has been recognized.

Figure 9:
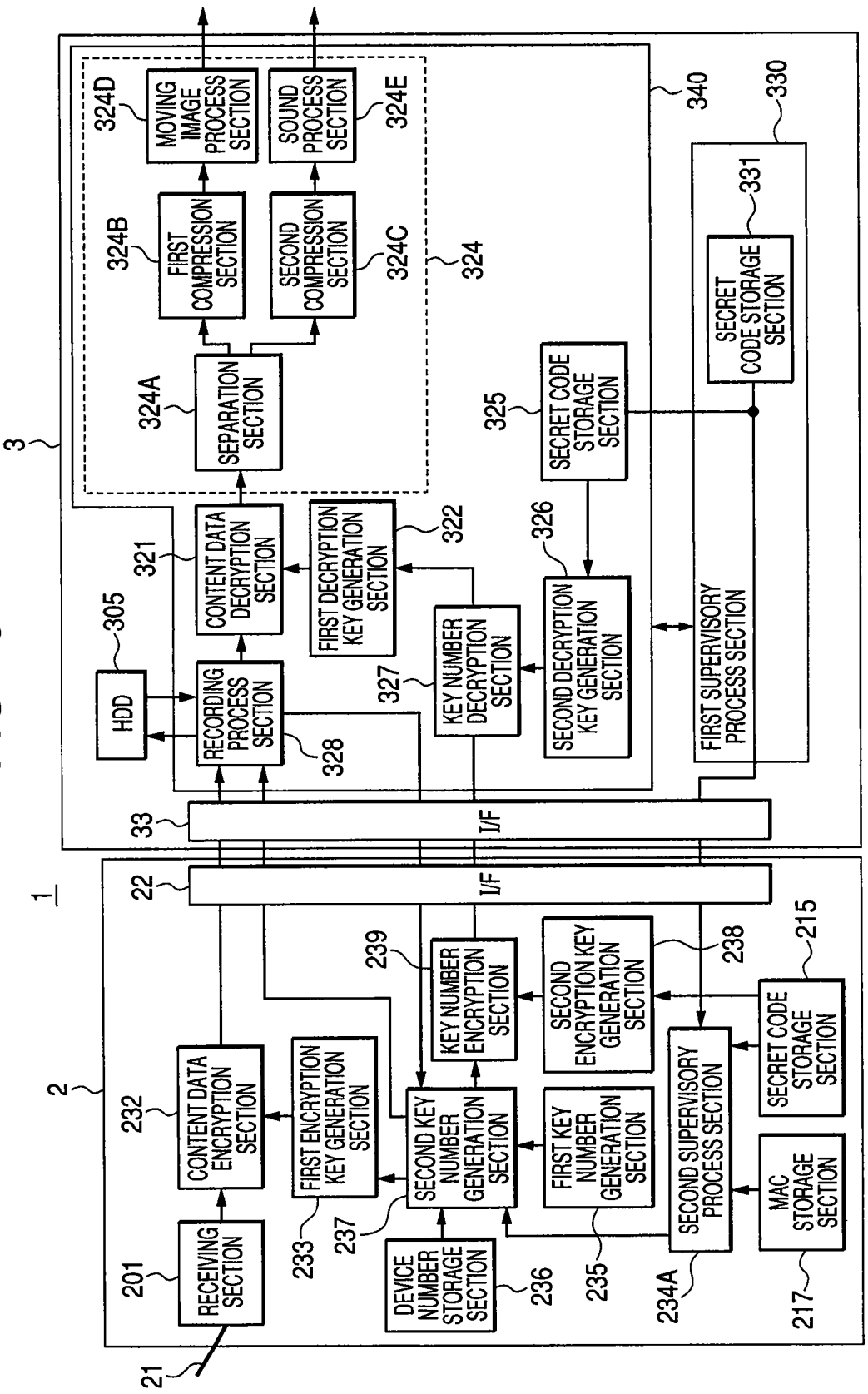
FIG. 9 is a diagram showing a data processing operation of content data executed by the digital broadcasting receiving system according to an embodiment.

Although the first embodiment shown in FIG. 8 is applied only to the case in which the received one-segment broadcast program is reproduced in real time, the digital broadcasting receiving system 1 can also be configured to further perform a process of recording the encrypted content data on an HDD as a second embodiment shown in FIG. 9. It should be noted that the same components as in FIG. 8 will be denoted with the same reference numerals, and the detailed descriptions therefor will be omitted.

A digital broadcasting receiving device 2 shown in FIG. 9 is configured by further providing a first key number generation section 235, a device number storage section 236, a second key number generation section 237, a second encryption key generation section 238, and a key number encryption section 239 to the functional block provided to the digital broadcasting receiving device 2 shown in FIG. 8.

Further, the main process section 340 is configured to further include a second decryption key generation section 326, a key number decryption section 327, and a recording process section 328.

The first key number generation section 235 periodically generates a random number as the predetermined data, and generates a first key number by applying a predetermined algorithm on the random number. Subsequently, the first key number generation section 235 supplies the second key number generation section 237 with the first key number.

Further, the first key number generation section 235 transmits the first key number to the recording process section 328 via the interface (I/F) 22 and the interface (I/F) 33.

The device number storage section 236 stores a unique device number assigned to every digital broadcasting receiving device, and supplies the second key number generation section 237 with the device number of the digital broadcasting receiving device 2.

The second key number generation section 237 generates a second key number using the first key number supplied from the first key number generation section 235 and the device number stored in the device number storage section 236, and supplies the key number encryption section 239 with the second key number.

The first encryption key generation section 233 generates the encryption key for encrypting the content data in accordance with the second key number generated by the second key number generation section 236.

When recording the content, the recording process section 328 records the content data received from the content data encryption section 232 via the interface (I/F) 22 and the interface (I/F) 33 and the first key number received from the first key number generation section 235 via the interface (I/F) 22 and the interface (I/F) 33 on the HDD 305.

Further, when reproducing the content, the recording process section 328 retrieves the encrypted content data and the encrypted first key number from the HDD 305 to supply the content data decryption section 321 with the encrypted content data, and transmits the first key number to the second key number generation section 237 via the interface (I/F) 22 and the interface (I/F) 33.

In response to receiving the first key number from the recording process section 328 via the interface (I/F) 33 and the interface (I/F) 22, the second key number generation section 237 performs a predetermined calculation using the first key number and the device number stored in the device number storage section 236 to generate the second key number, and then supplies the key number encryption section 239 with the second key number.

The second encryption key generation section 238 generates the encryption key used by the key number encryption section 239 in accordance with the secret code stored in the secret code storage section 215, and supplies the key number encryption section 239 with the encryption key.

The key number encryption section 239 encrypts the key number using the encryption key supplied from the second encryption key generation section 238, and transmits the encrypted key number to the key number decryption section 327 in the main process section 340 via the interface (I/F) 22 and the interface (I/F) 33.

The secret code storage section 325 stores the secret code attached to the main process 43, and supplies the second decryption key generation section 326 with the secret code.

The second decryption key generation section 326 generates the decryption key used by the key number decryption section 327 in accordance with the secret code supplied from the secret code storage section 325, and supplies the key number decryption section 327 with the decryption key.

In response to receiving the encrypted key number from the key number encryption section 239 via the interface (I/F) 22 and the interface (I/F) 33, the key number decryption section 327 decrypts the encrypted key number using the decryption key supplied from the second decryption key generation section 326, and supplies it to the first decryption key generation section 322.

The first decryption key generation section 322 generates the decryption key used by the content data decryption section 321 using the key number supplied from the key number decryption section 327, and supplies the content data decryption section 321 with the decryption key.

When the encrypted content data is supplied from the recording process section 328, the content data decryption section 321 decrypts the encrypted content data using the decryption key supplied from the first decryption key generation section 235.

In the case in which, for example, the second supervisory process section 234A has recognized an abnormality such as failure in periodically receiving the protective data from the first supervisory process section 330 or reception of different data than the protective data, it judges that some sort of problem has occurred in the system, and generates supervisory result data indicative of malfunction of the system to supply the second key number generation section 237 with the supervisory result data. The second key number generation section 237 changes the value of the key number in accordance with the supervisory result data. In this case, the display section 306 in the PC 3 is disabled to output a moving image or a sound.

Further, the second supervisory process section 234A compares the value of the secret code received from the first supervisory process section 330 with the value of the secret code stored in the secret code storage section 215. Subsequently, the second supervisory process section 234A supplies the second key number generation section 237 with the supervisory result data based on the result of the comparison.

The second key number generation section 237 supplied with the supervisory result data changes the value of the key number if the values of the secret codes are different from each other.

Further, the second supervisory process section 234A compares the MAC received from the first supervisory process section 330 with the MAC stored in the MAC storage section 217. Subsequently, the second supervisory process section 234A supplies the second key number generation section 237 with the supervisory result data based on the result of the comparison.

The second key number generation section 237 supplied with the supervisory result data changes the value of the key number if the values of the MACs are different from each other.

In the second embodiment described above, the first key number based on the periodically generated random number and the encrypted content data are recorded on the HDD 305.

Further, in the second embodiment, when reproducing the content of the one-segment broadcasting recorded on the HDD 305, the first key number and the encrypted content data are retrieved from the HDD 305, and the first key number is transmitted to the digital broadcasting receiving device 2 and is encrypted. Subsequently, the encrypted key number is transmitted again to the main process section 320 to decrypt the encrypted key number using the decryption key based on the secret code stored in the secret code storage section 325. After then, the decryption key is generated in accordance with the decrypted key number, and the encrypted content data is decrypted using the decryption key.

As described above, since the first key number is recorded together with the content data in recording the content data, the value of the encryption key of the content data based on the second key number generated using the first key number and the device number does not match the value of the decryption key of the content data. Thus, the content can be prevented from being reproduced even if some sort of alteration is made in the content data while recorded on the HDD 305 and thus key number is altered.

It should be appreciated that although in the embodiments described above, the PC is used as the information processing device, any other information processing device can be adopted having similar interior configurations to the PC 3 described above, and a portable terminal such as a cellular phone can also be adopted.

Further, although in the embodiments described above the receiving section 201 is assumed to receive the broadcast signal of the one-segment broadcasting of the terrestrial digital broadcasting, any broadcast signals can be included providing they are broadcast signals of digital broadcasting.

Further, although in the embodiments described above, the secret code issuing section 213, the secret code adding section 214, the MAC calculation section 216, the secret code storage section 215, and the MAC storage section 217 are provided as the means for protecting the main process, the means for protecting the main process is not limited thereto.

Further, although in the embodiments described above, the program file of the dedicated application software includes the different two processes, namely the supervisory process 42 and the main process 43, it is also possible that a single process has the functions of the main process and the supervisory process.

Further, although in the embodiments described above, the whole of each of the supervisory process 42 and the main process 43 is encrypted and decrypted, it is also possible to select a part of each of the processes which is particularly necessary to be protected from alteration, and to encrypt and decrypt only that part.

Further, although in the embodiments described above, the random number is used as the predetermined data, it should be appreciated that any data can be adopted providing the encryption key, the decryption key, and the key number can be generated from the data.

It should be understood by those skilled in the art that various modifications, combinations, sub-combinations, and alterations may occur depending on design requirements and the other factors insofar as they are within the scope of the appended claims or the equivalents thereof.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A digital broadcasting receiving system, comprising:
an information processing device for executing a program file including a loader, a main process that is at least partially encrypted, and a supervisory process that is at least partially encrypted and for supervising main processing according to the main process; and
a digital broadcasting receiving device detachably connected to the information processing device and for receiving a broadcast signal of digital broadcasting;
wherein the information processing device includes storage section on which the loader is developed in a executable condition, and transmits the main process that is at least partially encrypted and the supervisory process that is at least partially encrypted to the digital broadcasting receiving device,
wherein said the digital broadcasting receiving device includes:
a receiver for receiving the broadcast signal of the digital broadcasting to generate content data,
a decryption key storage section for storing a decryption key,
a process decryption section for decrypting the main process and the supervisory process received from the information processing device using the decryption key stored in the decryption key storage section,
a protective data adding section for adding protective data to the main process decrypted by the process decryption section, and
a first protective data storage section for storing the protective data,
the information processing device, in accordance with the loader, receives the decrypted main process and the decrypted supervisory process from the digital broadcasting receiving device, and develops the decrypted main process and the decrypted supervisory process on the storage section included in the information processing device.

2. The digital broadcasting receiving system of claim 1, wherein:
(a) the protective data adding section issues a secret code and adds the secret code to the main process decrypted by the process decryption section as the protective data; and
(b) the first protective data storage section stores the secret code issued by the protective data adding section.

3. The digital broadcasting receiving system of claim 2, wherein:
(a) the protective data adding section calculates a unique value generated in accordance with a program sentence of the main process added with the secret code, and adds the unique value to the main process as the protective data; and
(b) the first protective data storage section stores the unique value of the main process.

4. The digital broadcasting receiving system of claim 1, wherein:
(a) the digital broadcasting receiving device further includes a process encryption section for encrypting at least a part of the main process decrypted by the process decryption section and at least a part of the supervisory process decrypted by the process decryption section; and (b) the information processing device further includes a process decryption section for decrypting the main process that is at least partially encrypted and the supervisory process that is at least partially encrypted received from the process encryption section.

5. The digital broadcasting receiving system of claim 1, wherein:

(a) the program file is added with a key number of an encryption key used for encrypting at least a part of the main process and at least a part of the supervisory process;

(b) the digital broadcasting receiving device further includes:
 (i) a process encryption section for encrypting at least a part of the main process decrypted by the process decryption section and at least a part of the supervisory process decrypted by the process decryption section; and
 (ii) a decryption key set storage section for storing a plurality of decryption key sets, each decryption key set comprising the key number added to every program file and the decryption key corresponding to the key number;

(c) the information processing device further includes a process decryption section for decrypting the main process that is at least partially encrypted and the supervisory process that is at least partially encrypted received form the process encryption section; and (d) the encryption key storage section selects the decryption key corresponding to the key number having the same value as the key number added to the program file from the decryption key set storage section and stores the selected decryption key.

6. The digital broadcasting receiving system of claim 1, wherein:

(a) the digital broadcasting receiving device includes:
 (i) a first encryption key generation section for generating a content data encryption key based on a predetermined signal; and
 (ii) a content data encryption section for encrypting the content data generated by the receiving section using the content data encryption key generated by the first encryption key generation section;

(b) the information processing device includes:
 (i) a main process section for performing a predetermined process in accordance with the main process developed on the storage section; and
 (ii) a first supervisory process section for supervising the main process section in accordance with the supervisory process developed on the storage section;

(c) wherein the main process section includes:
 a first decryption key generation section for generating a content data decryption key based on predetermined data;
 (ii) a content data decryption section for decrypting the content data received from the content data encryption section using the content data decryption key generated by the first decryption key generation section;
 (iii) a content reproduction section for reproducing the content from the content data decrypted by the content data decryption section; and (iv) a second protective data storage section for storing protective data added to the main process by main process protection section; and (d) the first supervisory process section transmits the protective data stored in the second protective data storing section to the digital broadcasting receiving device; and (e) the digital broadcasting receiving device includes a second supervisory process section for generating supervisory result data based on the protective data received from the first supervisory process section and the protective data stored in the first protective data storage section.

7. The digital broadcasting receiving system of claim 6, wherein:

(a) the digital broadcasting receiving device includes:
 (i) a first key number generation section for generating a first key number based on predetermined data;
 (ii) a device number storage section for storing a device number of the digital broadcasting receiving device;
 (iii) a second key number generation section for generating a second key number;
 (iv) a second encryption key generation section for generating a second encryption key in accordance with the protective data stored in the first protective data storage section; and
 (v) a key number encryption section for encrypting the second key number generated by the second key number generation section using the second encryption key generated by the second encryption key generation section;

(b) the main process section includes:
 (i) recording process section for writing and/or retrieving predetermined data to and/or from recording section provided to the information processing device;
 (ii) second decryption key generation section for generating a second decryption key in accordance with the protective data stored in the second protective data storage section; and
 (iii) key number decryption section for decrypting the second key number received from the key number encryption section using the second decryption key generated by the second decryption key generation section;

(c) the second key number generation section supplies the encryption key generation section with the second key number generated using the first key number and the device number;

(d) the recording process section writes the content data and the first key number received from the content data encryption section and the first key number generation section, respectively, in the recording section, retrieves the content data and the first key number written in the recording section to supply the content data decryption section with the content data and to transmit the first key number to the second key number generation section;

(e) the second key number generation section supplies the key number encryption section with the second key number generated using the first key number received from the recording process section and the device number;

(f) the key number encryption section transmits the encrypted second key number to the key number decryption section; and (g) the key number decryption section supplies the first decryption key generation section with the decrypted second key number.

8. A digital broadcasting receiving device detachably connected to an information processing device for executing a program file including a loader, a main process that is at least partially encrypted, and a supervisory process that is at least partially encrypted and for supervising main processing according to the main process for receiving a broadcast signal of digital broadcasting, and to which the main process that is at least partially encrypted and the supervisory process that is at least partially encrypted are transmitted from the information processing device provided with a storage section on which the loader is developed in a executable condition, said digital broadcasting receiving device comprising:

- a receiver for receiving the broadcast signal of the digital broadcasting to generate content data,
- a decryption key storage section for storing a decryption key,
- a process decryption section for decrypting the main process that is at least partially encrypted and the supervisory process that is at least partially encrypted transmitted from the information processing device using the decryption key stored in the decryption key storage section,
- a protective data adding section for adding protective data to the main process decrypted by the process decryption section, and
- a first protective data storage section for storing the protective data.

9. The digital broadcasting receiving device of claim 8, wherein:
   (a) the protective data adding section issues a secret code and adds the secret code to the main process decrypted by the process decryption section as the protective data; and
   (b) the first protective data storage section stores the secret code issued by the protective data adding section.

10. The digital broadcasting receiving device of claim 9, wherein:
   (a) the protective data adding section calculates a unique value generated in accordance with a program sentence of the main process added with the secret code, and adds the unique value to the main process as the protective data; and
   (b) the first protective data storage section stores the unique value of the main process.

* * * * *